(12) United States Patent
Lam

(10) Patent No.: US 9,910,289 B2
(45) Date of Patent: Mar. 6, 2018

(54) MINIATURE LENS DRIVING APPARATUS

(71) Applicant: Sunming Technologies (HK) Limited, Hong Kong (HK)

(72) Inventor: Sio Kuan Lam, Hong Kong (HK)

(73) Assignee: Sunming Technologies (HK) Limited, Hong Kong (HK)

( * ) Notice: Subject to any disclaimer, the term of this patent is extended or adjusted under 35 U.S.C. 154(b) by 109 days.

(21) Appl. No.: 14/712,931

(22) Filed: May 15, 2015

(65) Prior Publication Data
US 2016/0097937 A1 Apr. 7, 2016

Related U.S. Application Data

(60) Provisional application No. 62/060,576, filed on Oct. 7, 2014.

(51) Int. Cl.
*G02B 27/64* (2006.01)
*G02B 7/09* (2006.01)

(52) U.S. Cl.
CPC ............ *G02B 27/646* (2013.01); *G02B 7/09* (2013.01)

(58) Field of Classification Search
CPC .. G02B 27/64; G02B 27/646; H04N 5/23251; H04N 5/23264; G03B 2205/0007

USPC .......... 359/823, 824, 814, 554–557; 396/55; 348/208.11

See application file for complete search history.

(56) References Cited

U.S. PATENT DOCUMENTS

| | | | | |
|---|---|---|---|---|
| 8,218,016 B2* | 7/2012 | Park | ...... | G03B 17/00 348/208.11 |
| 8,611,735 B2* | 12/2013 | Sekimoto | ...... | G03B 17/00 348/208.99 |
| 9,179,066 B1* | 11/2015 | Tsai | ...... | H02P 25/028 |
| 2006/0202566 A1* | 9/2006 | Osaka | ...... | H02K 41/0356 310/15 |
| 2016/0070115 A1* | 3/2016 | Miller | ...... | G02B 27/646 359/557 |

* cited by examiner

*Primary Examiner* — Audrey Y Chang

(57) ABSTRACT

A miniature lens driving apparatus includes an optical image stabilization mechanism having a lens holder for holding therein a lens which defines an optical axis, an autofocus mechanism having an autofocus moving platform, and a plurality of wires adapted to couple the lens holder with the autofocus moving platform. The optical image stabilization mechanism is capable of moving the lens holder along a direction substantially perpendicular to the optical axis, and the autofocus mechanism is capable of moving the autofocus moving platform along the optical axis.

18 Claims, 15 Drawing Sheets

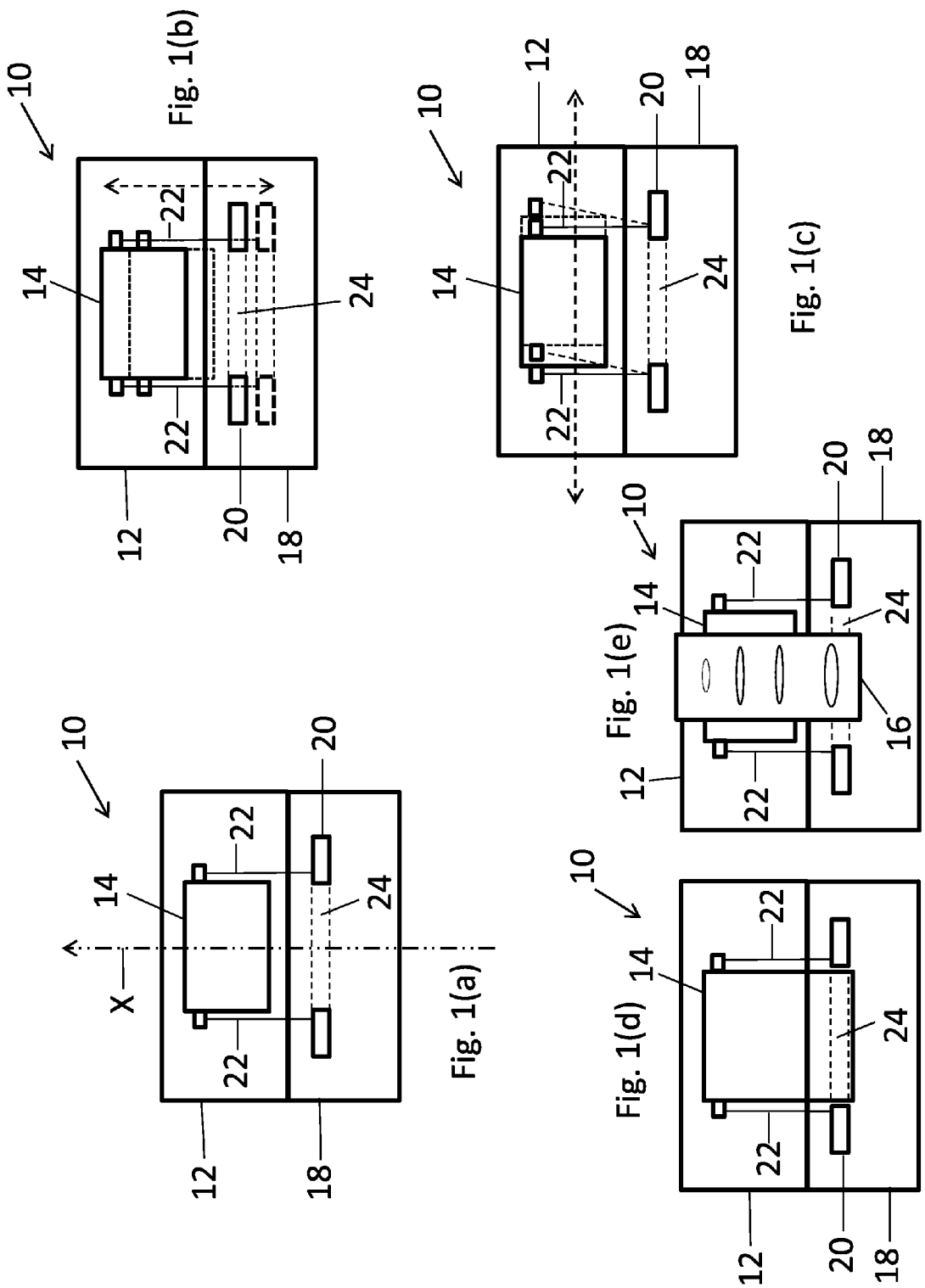

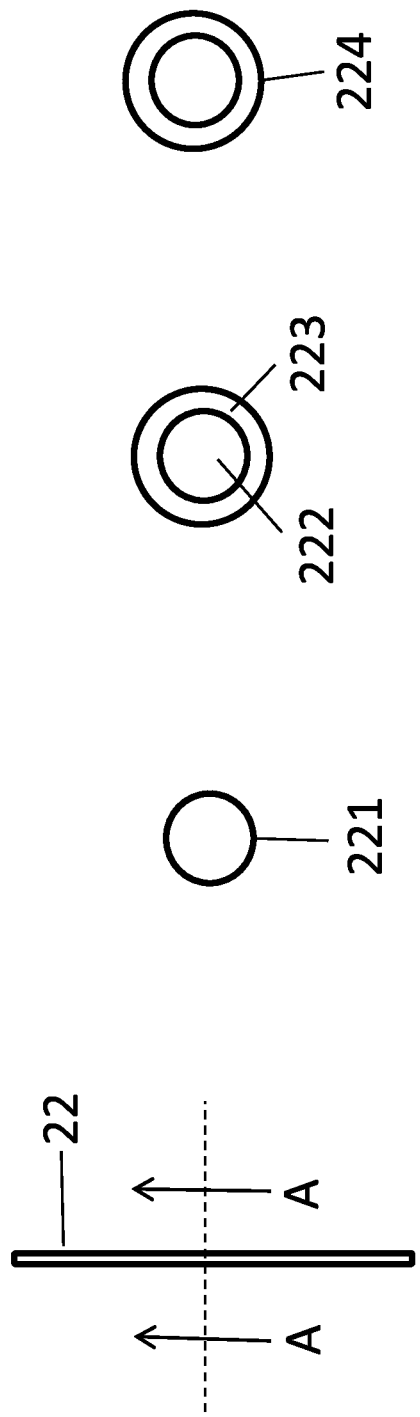

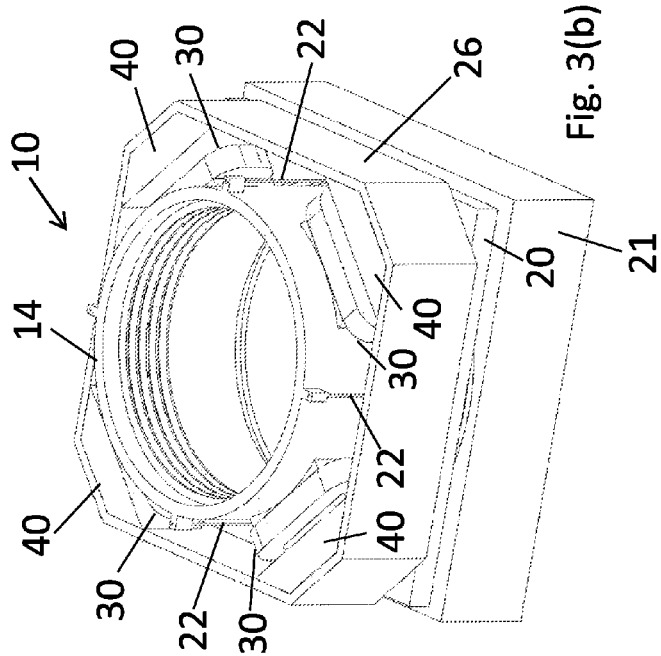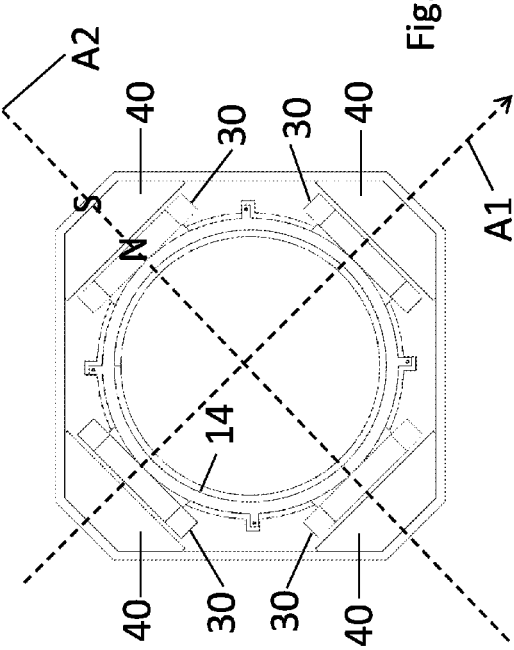

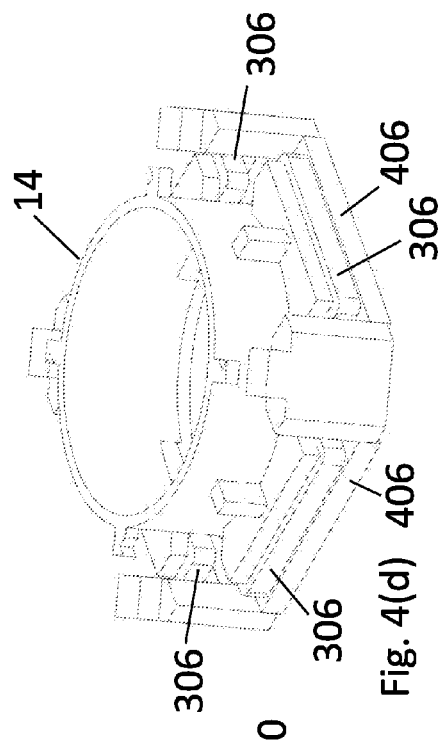
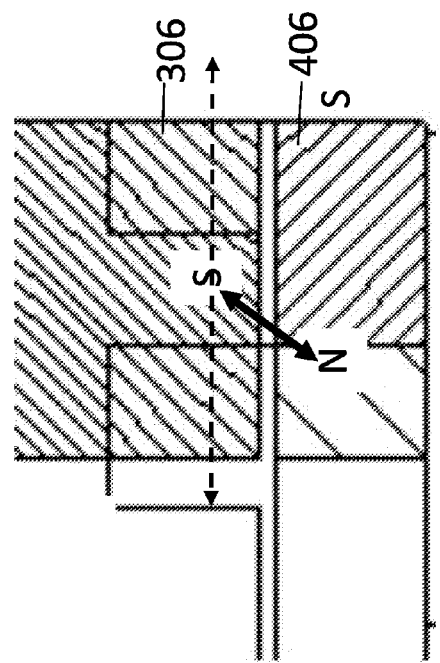
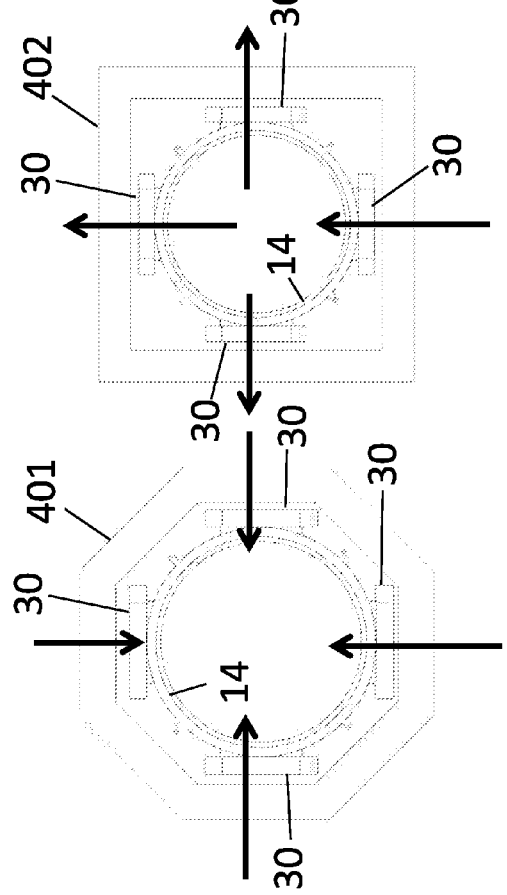
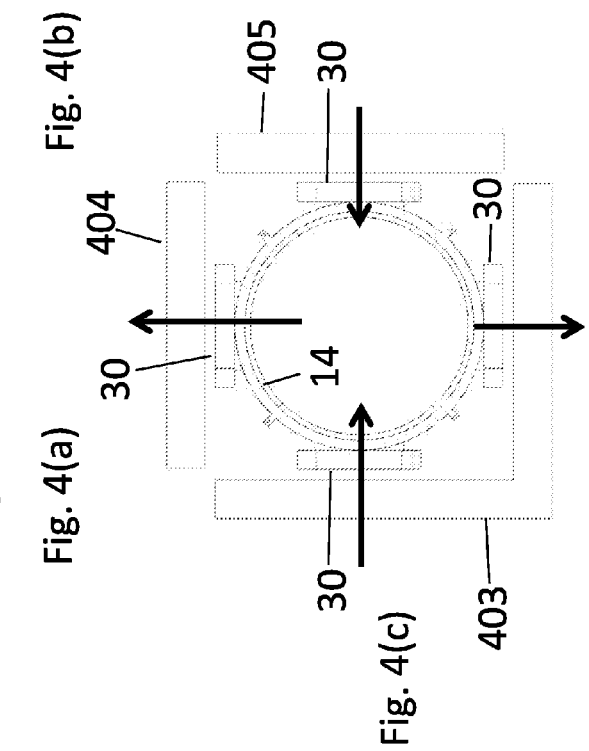

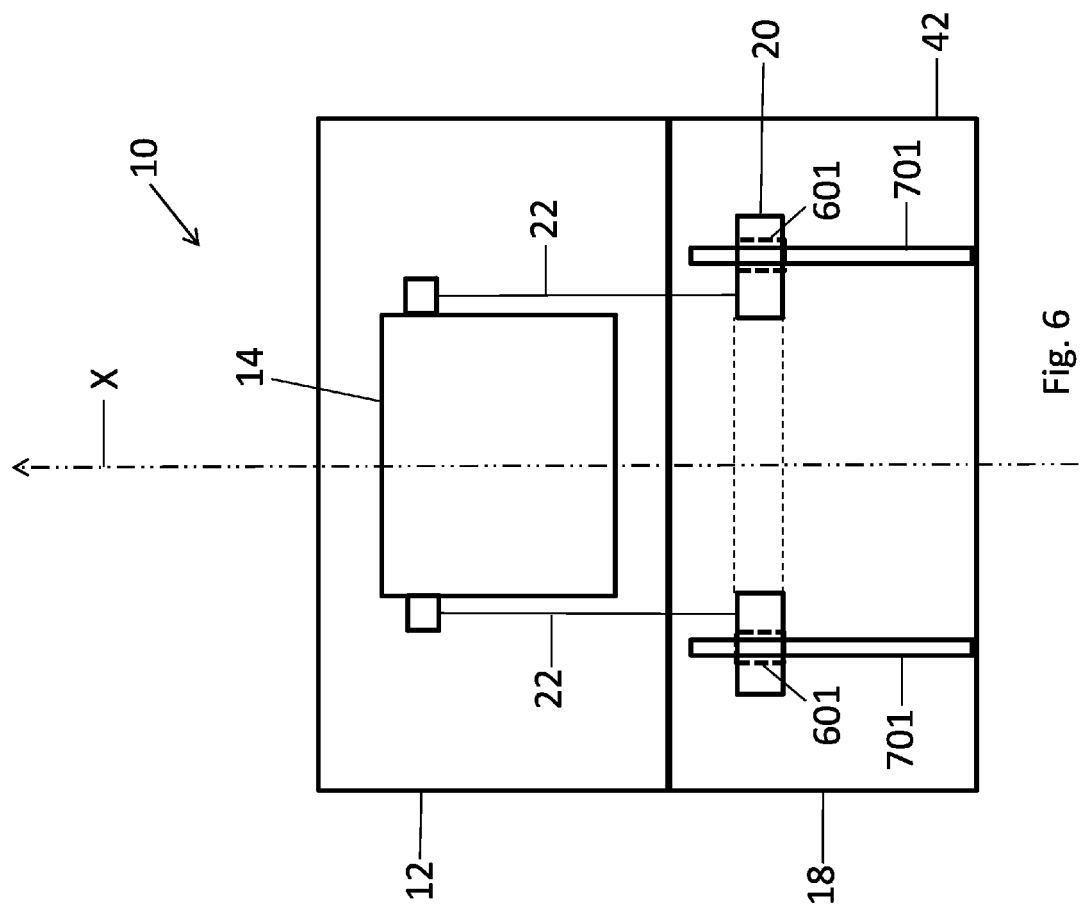

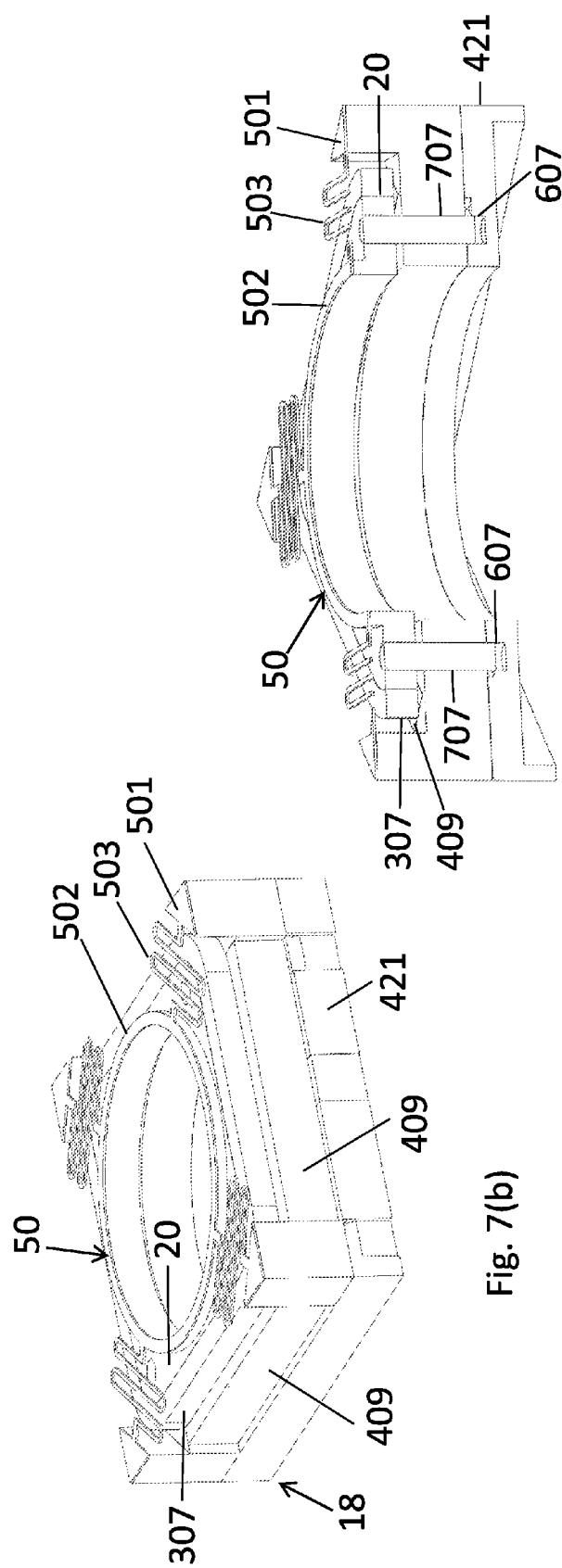

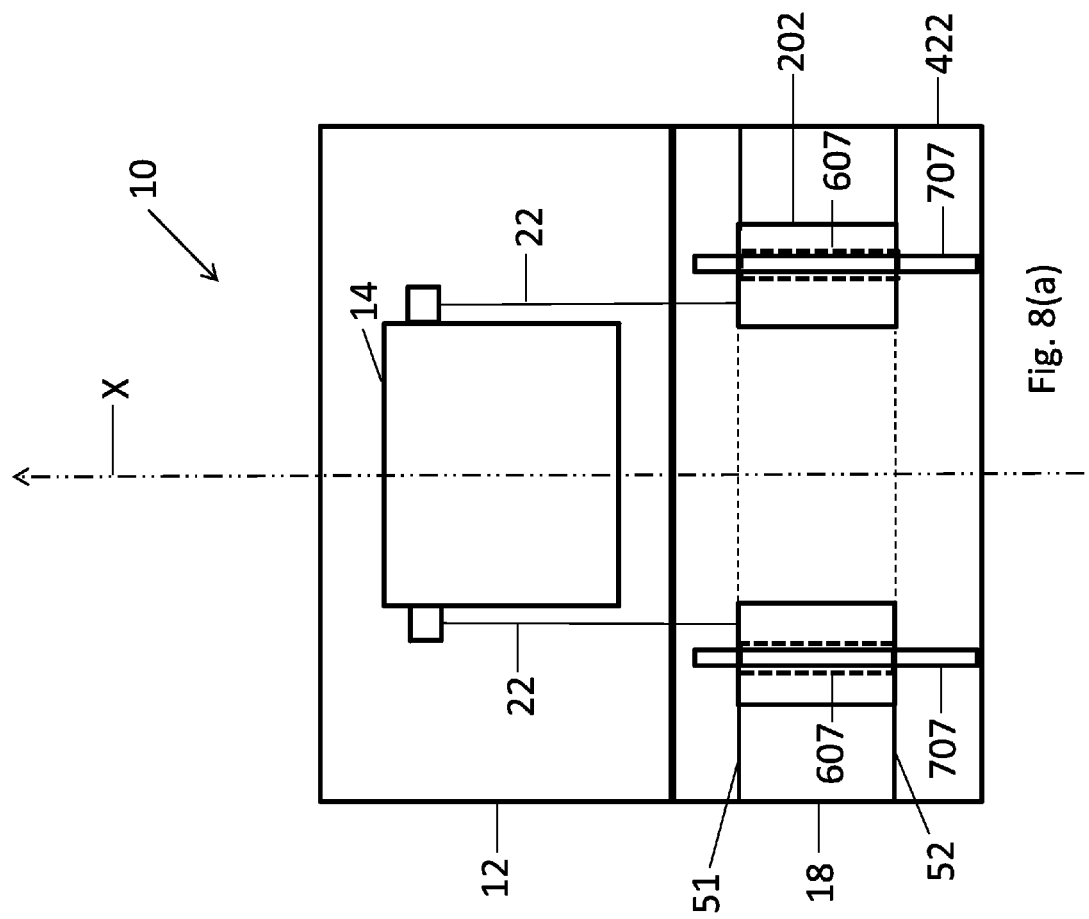

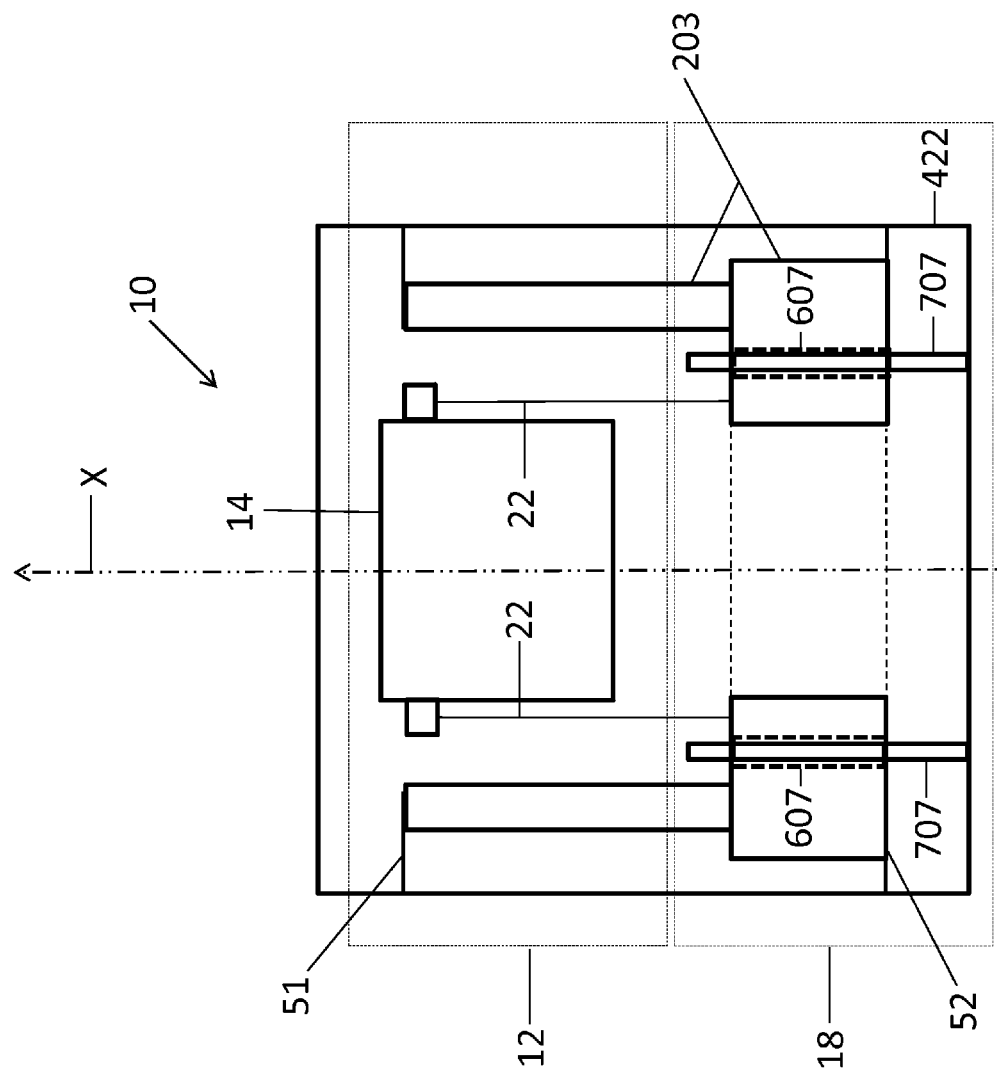

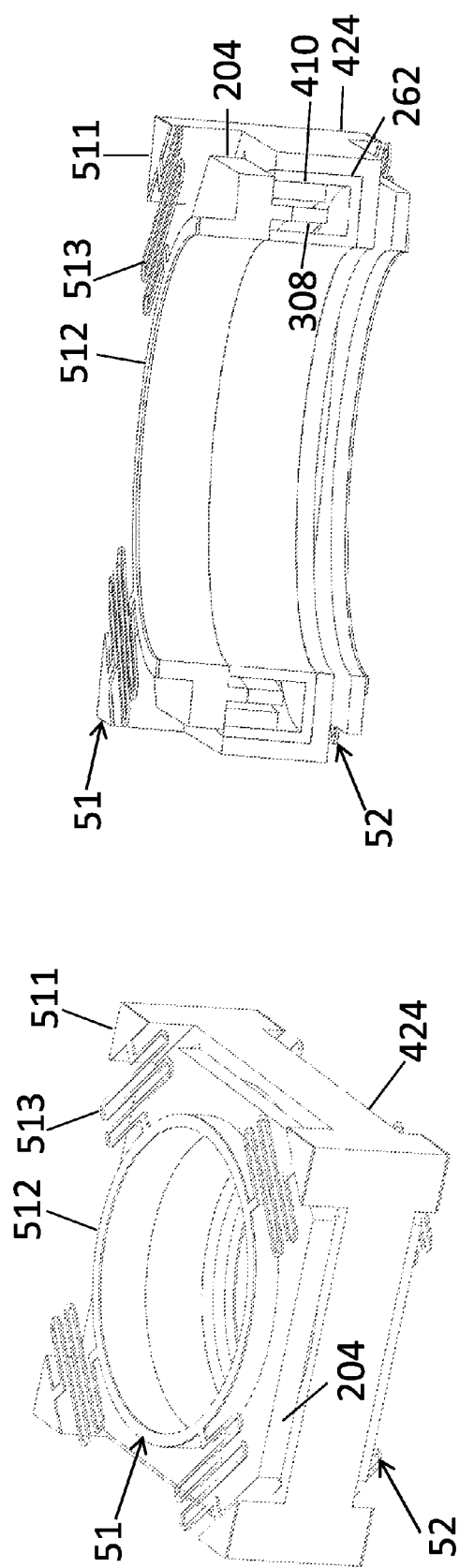
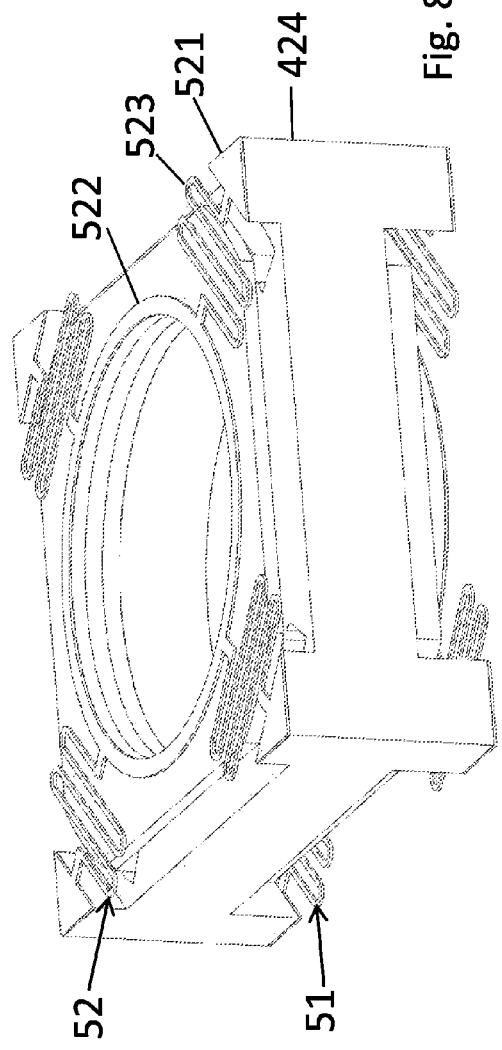
Fig. 8(c)
Fig. 8(d)
Fig. 8(e)

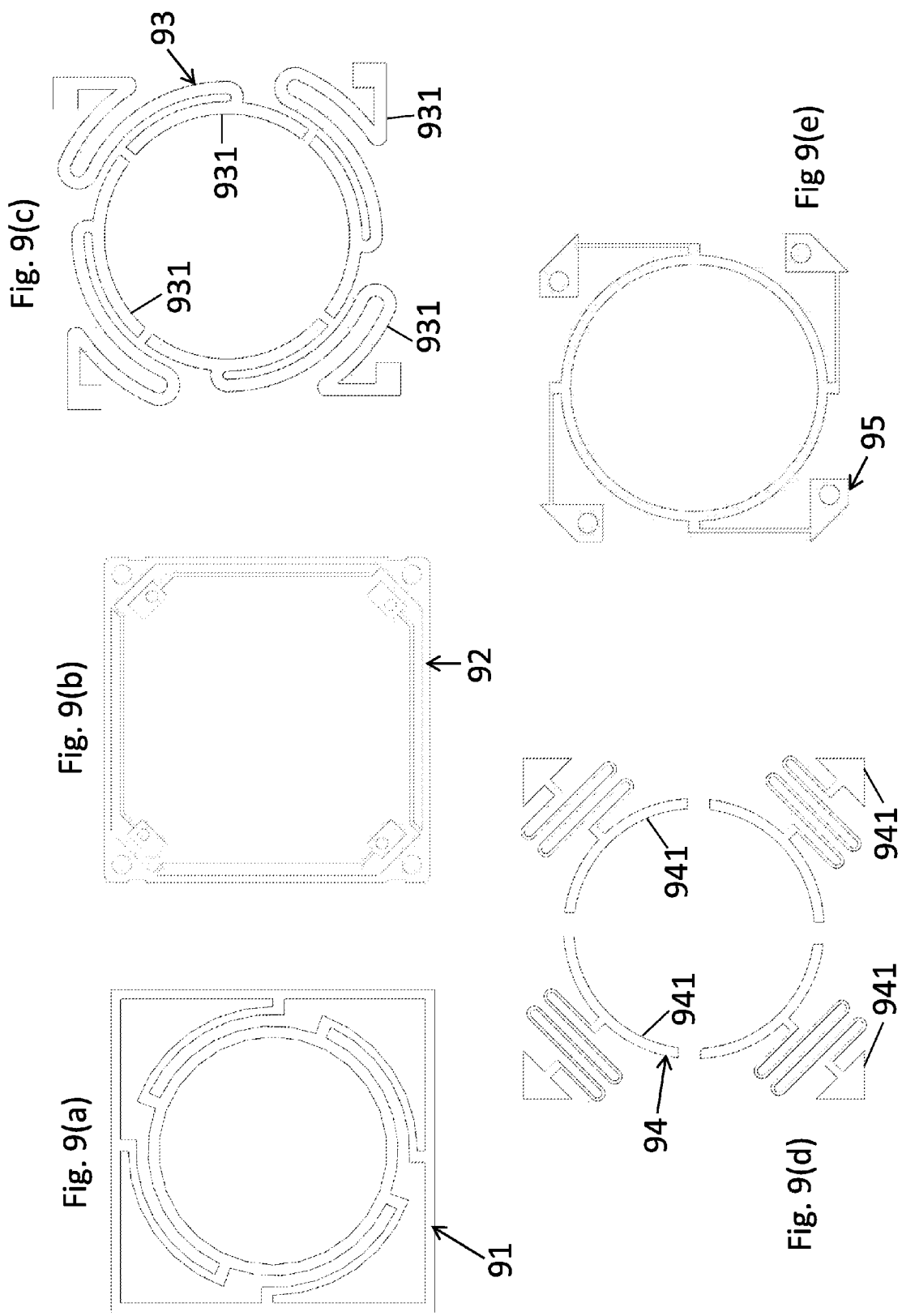

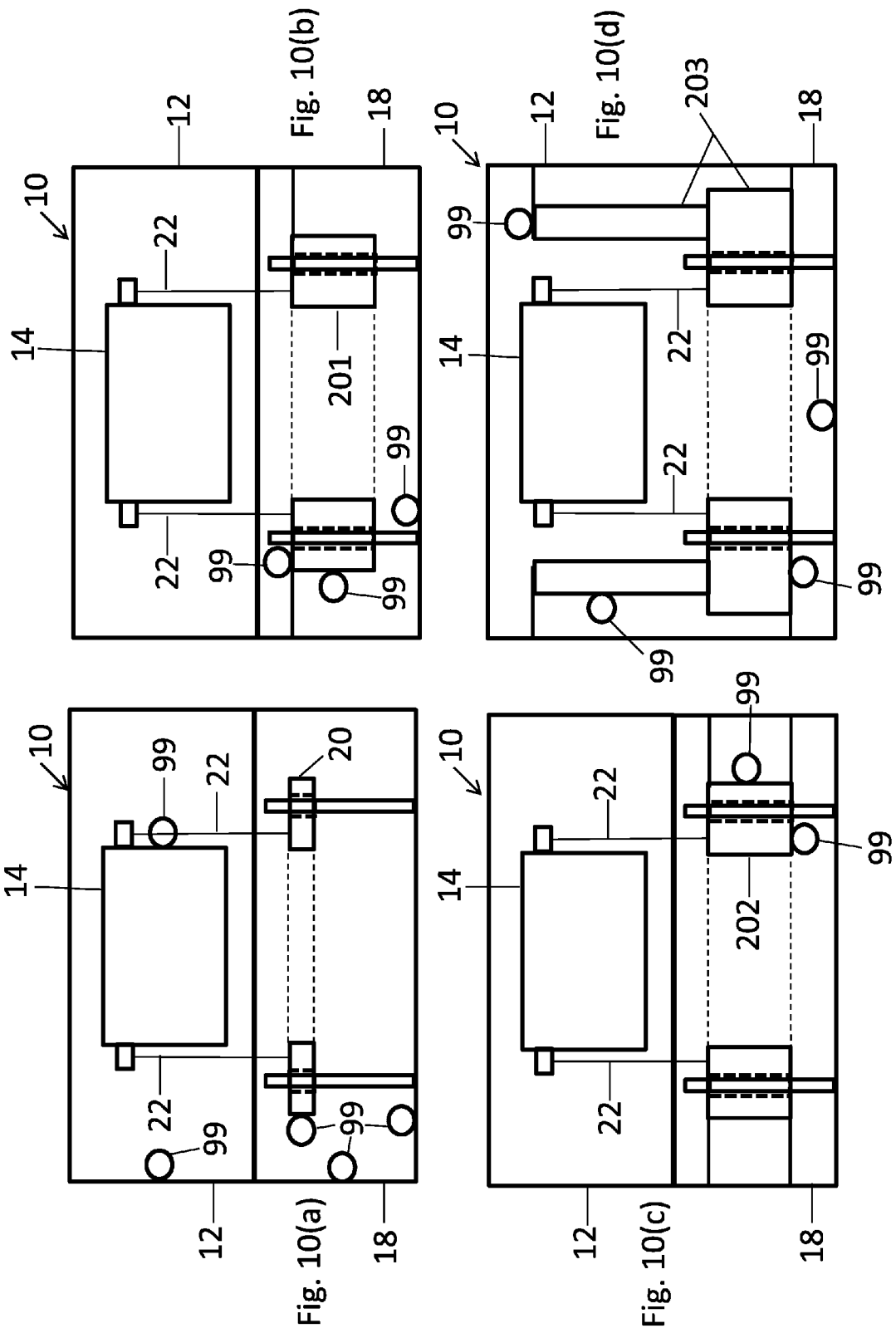

MINIATURE LENS DRIVING APPARATUS

CROSS-REFERENCE TO RELATED APPLICATIONS

This application claims the benefit of U.S. Provisional Application No. 62/060,576, filed Oct. 7, 2014, the entire content of which is hereby incorporated by reference.

FIELD OF THE TECHNOLOGY

The present application relates generally to a lens driving apparatus which may be integrated within a compact camera module used for portable electronic devices.

BACKGROUND

Compact camera modules have been widely adopted in many types of portable electronic device such as smart phones. Many sophisticated camera functions, such as autofocus, have been integrated into compact camera modules. Recently, the market is requesting camera modules to equip with optical image stabilization function. This in turn requests to have a miniature lens driving apparatus which is capable of moving the imaging lens along X, Y, and Z directions.

SUMMARY

According to one aspect, there is provided a miniature lens driving apparatus including an optical image stabilization mechanism having a lens holder for holding therein a lens assembly which defines an optical axis, an autofocus mechanism having an autofocus moving platform movable along the said optical axis, and a plurality of wires. The optical image stabilization mechanism may include an electromagnetic actuator to move the lens holder along the direction substantially perpendicular to the optical axis. The autofocus mechanism may include an electromagnetic actuator configured to move the autofocus moving platform along the said optical axis. A plurality of wires can be configured to couple the lens holder with the autofocus moving platform.

The plurality of wires may be selected from the group consisting of metal wires, enamel wires, metal-clad metal wires, metal-clad non-conductive material wires, non-conductive material wires, and combinations thereof. The non-conductive material may be selected from the group consisting of polymers, plastics, rubber, organic and inorganic materials.

According to another aspect, there is provided a miniature lens driving apparatus including an optical image stabilization mechanism having a lens holder for holding therein a lens which defines an optical axis, an autofocus mechanism having an autofocus moving platform; and a plurality of wires adapted to couple the lens holder with the autofocus moving platform. The optical image stabilization mechanism is capable of moving the lens holder along a direction substantially perpendicular to the optical axis, and the autofocus mechanism is capable of moving the autofocus moving platform along the optical axis.

In one embodiment, the optical image stabilization mechanism may include a piezoelectric actuator capable of moving the lens holder along the direction substantially perpendicular to the optical axis.

In one embodiment, the optical image stabilization mechanism may include a micro-electro-mechanical actuator capable of moving the lens holder along the direction substantially perpendicular to the optical axis.

In one embodiment, the optical image stabilization mechanism may include an electromagnetic actuator, which may include a lens holder, a plurality of coils, at least one magnet, and a plurality of wires. One of the (i) plurality of coils, and (ii) at least one magnet may be firmly mounted on the lens holder, while the other one of the (i) plurality of coils, and (ii) at least one magnet may be firmly mounted on the autofocus moving platform. The plurality of coils may be operatively associated with the at least one magnet to move the lens holder along the direction substantially perpendicular to the optical axis.

The autofocus mechanism may further include at least one coil, at least one magnet and a base. One of the (i) at least one magnet, and (ii) at least one coil may be firmly mounted on the base, while the other one of the (i) at least one magnet, and (ii) at least one coil may be firmly attached to the autofocus moving platform. The at least one coil may be operatively associated with the at least one magnet to move the autofocus moving platform along the optical axis.

The lens driving apparatus may further include at least one yoke made of magnetic conductive materials and operatively associated with a coil-magnet assembly to confine spatially magnetic field distribution.

The plurality of wires may be selected from the group consisting of metal wires, enamel wires, metal-clad metal wires, metal-clad non-conductive material wires, non-conductive material wires, and combinations thereof. The non-conductive material may be selected from the group consisting of polymers, plastics, rubber, organic and inorganic materials.

In one embodiment, the plurality of wires may be made of conductive material to provide direct or indirect electric connection between a plurality of coils mounted on the optical image stabilization mechanism and a plurality of electrodes respectively.

In one embodiment, the autofocus mechanism may include at least one guiding mechanism which may include a stationary guide member and a slidable guide member. The stationary guide member may be firmly mounted on a base of the autofocus mechanism, while the slidable guide member may be firmly mounted on the autofocus moving platform of the autofocus mechanism.

The guiding mechanism may include guiding members selected from the group consisting of guiding shafts, V-shaped grooves, dovetail-shaped grooves, C-shaped grooves, guiding planes, guiding holes and guiding rings.

The autofocus mechanism may further include at least one spring connecting the autofocus moving platform and a stationary portion of the autofocus mechanism.

The at least one spring may be selected from the group consisting of leaf spring, helix spring, and elastic film.

In one embodiment, the spring may include an outer zone, an inner zone, and a buffer zone. The outer zone may be connected to a stationary portion of the autofocus mechanism. The inner zone may be connected to the autofocus moving platform. The buffer zone, which is the zone between the outer and inner zones, may be deformable during movement of the autofocus moving platform.

The autofocus mechanism may further include a plurality of springs, wherein one of the springs is connecting an upper portion of the autofocus moving platform to a stationary portion of the autofocus mechanism, and another one of the springs is connecting a lower portion of the autofocus moving platform to the stationary portion of the autofocus mechanism.

In one embodiment, the optical image stabilization mechanism may further include one Hall sensor to measure lens position during optical image stabilization movement.

In one embodiment, the optical image stabilization mechanism may further include at least one position encoder to measure lens position during optical image stabilization movement.

In one embodiment, the autofocus mechanism may further include at least one Hall sensor to measure lens position during autofocus movement.

In one embodiment, the autofocus mechanism may further include at least one position encoder to measure lens position during autofocus movement.

Although the miniature lens driving apparatus is shown and described with respect to certain embodiments, it is obvious that equivalents and modifications will occur to others skilled in the art upon the reading and understanding of the specification. The miniature lens driving apparatus in the present application includes all such equivalents and modifications, and is limited only by the scope of the claims.

BRIEF DESCRIPTION OF THE DRAWINGS

Specific embodiments of the miniature lens driving apparatus will now be described by way of example with reference to the accompanying drawings wherein:

FIGS. 1(a)-1(e) show some conceptual drawings of a miniature lens driving apparatus according an embodiment of the present application.

FIGS. 2 (a)-2(e) show a wire and cross sectional views of some embodiments of the wire.

FIGS. 3 (a)-(c) show different views of an OIS mechanism of the miniature lens driving apparatus of FIG. 1.

FIGS. 4 (a)-(e) show various embodiments of a coil-magnet assembly of an OIS mechanism.

FIGS. 6, 6(a)-6(e) show another embodiment of the AF mechanism and different embodiments of the guiding mechanism.

FIGS. 7(a)-(c) show another embodiment of the AF mechanism, which includes an AF moving platform, at least a coil, at least a magnet, a base, at least a guiding mechanism, and at least a leaf spring.

FIGS. 8(a)-(e) show another embodiment of the AF mechanism, which includes an AF moving platform, at least a coil, at least a magnet, a base, and a plurality of leaf springs.

FIGS. 9(a)-(e) show different embodiments of a spring.

FIGS. 10(a)-(d) show different embodiments of the lens driving apparatus and position of a plurality of Hall sensors.

DETAILED DESCRIPTION

Figure 5:
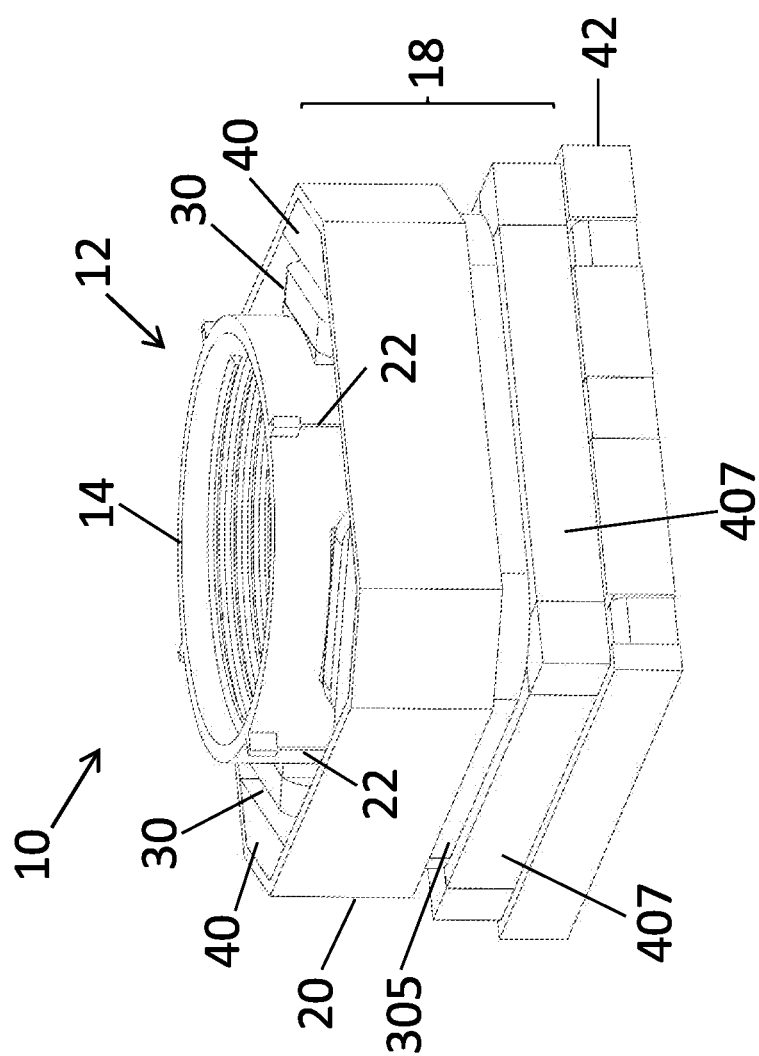
FIG. 5 is a perspective view of an embodiment of an AF mechanism, which includes an AF moving platform, at least one coil, at least one magnet and a base.

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe such embodiments, terms "above", "below", "upper", "lower", and "side" describes positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be understood that the present application is not limited to the preferred embodiments described hereinabove and, needless to say, a variety of modifications or variations may be made without departing from the scope of the protection defined herein.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

It should be noted that throughout the specification and claims herein, the term "wire" is defined as a thin length of a material. It can also be a thread of metal, polymer, cotton, hemp, or other material twisted together to form a thin length or line. It is used as a synonym of string, rope, cord, thread, and line.

A miniature lens driving apparatus 10 may include an optical image stabilization (OIS) mechanism 12 having a lens holder 14 for holding therein a lens or lens assembly 16 which defines an optical axis X, an autofocus (AF) mechanism 18 having an AF moving platform 20, and a plurality of wires 22.The OIS mechanism 12 is capable of moving the lens holder 14 along a direction substantially perpendicular to the optical axis X, and the AF mechanism 18 is capable of moving the AF moving platform 20 along the optical axis X. The lens holder 14 of the OIS mechanism 12 can be coupled to the AF moving platform 20 via the plurality of wires 22. Defined hereinafter, the AF moving platform 20 is referring to the aggregation of all moving parts of the AF mechanism 18, but excluding coils 30, magnets 40, and springs 50 which will be described later.

FIGS. 1(*a*)-(*e*) show some conceptual drawings of an embodiment of a miniature lens driving apparatus 10. The two rectangles represent the OIS mechanism 12 and AF mechanism 18 respectively. Regardless the detail structure of the OIS mechanism 12, the OIS mechanism 12 may include a lens holder 14 used to hold a lens or lens assembly 16. Regardless of the detail structure of the AF mechanism 18, the AF mechanism 18 may include an AF moving platform movable along the optical axis X. As shown in FIGS. 1(*a*)-(*e*), regardless of the detail structure of the OIS mechanism 12, the OIS mechanism 12 may include at least one actuator coupling to the lens holder 14 and capable of moving the lens holder 14 along a direction substantially perpendicular to the optical axis X. The actuator could be an electromagnetic actuator, piezoelectric actuator, MEMS (Micro-electro-mechanical Systems) actuator, and/or a combination thereof.

As shown in FIGS. 1(*a*)-(*e*), the AF moving platform 20 may be a flat plate having a hollow portion 24 used to receive the lens holder 14 or lens 16 coming from the OIS mechanism 12. In other embodiments, the AF moving platform 20 can be a component having a complex structure. In some other embodiments, the AF moving platform 20 can be formed by a plurality of individual components but moving along the optical axis X simultaneously and synchronically. FIG. 1(*a*) shows that the lens holder 14 of the OIS mechanism 12 may be coupled to the AF moving platform 20 of the AF mechanism 18 via at least two wires 22. The first ends (upper ends) of the wires 22 can be connected to an upper portion of the lens holder 14 directly. In some embodiments, the upper ends of wires 22 can be connected to either an upper end of the lens holder 14, or a lower end of the lens holder 14, or any location between the upper and lower ends of the lens holder 14. In some other embodiments, the upper ends of the wires 22 can be connected to the lens holder 14 indirectly. The second ends (lower ends) of the wires 22 can be connected to the AF moving platform 20 either directly or indirectly. Due to the rigidity of the wires 22 along the optical axis X and the flexibility of the wires 22 along the direction perpendicular to the optical axis X, the AF mechanism 18 is capable of moving the lens holder 14 along the optical axis X via the AF moving platform 20, as shown by the dotted arrows in FIG. 1(*b*), while the OIS mechanism 12 is capable of moving the lens holder 14 along a direction perpendicular to the optical axis X, as shown by the dotted arrows in FIG. 1(*c*).

Furthermore, as shown in FIG. 1(*d*), the lens holder 14 may extend into the hollow portion 24 of the AF moving platform 20. In FIG. 1(*e*), the lens holder 14 does not extend into the hollow portion 24 of the AF moving platform 20. However, the lens or lens assembly 16 mounted on the lens holder 14 may extend into the hollow portion 24 of the AF moving platform 20. Beside the scenarios in FIGS. 1(*d*) and 1(*e*), there are other possible combinations of length of the lens 16, lens holder 14, and area/diameters/dimensions of hollow portion 24 of the AF moving platform 20. Needless to say, all these possible combinations do not depart from the scope of protection defined herein.

FIGS. 2(*a*)-(*e*) show some detail structures of the plurality of wires 22. FIGS. 2(*b*)-2(*e*) are cross sectional views of some embodiments of the wires 22 taken along line A-A of FIG. 2(*a*). The wire 221 (FIG. 2(*b*)) may be made of either conductive materials such as metal, organic conductive materials, or non-conductive materials such as polymeric materials, plastics, rubbers, organic fibers, etc. The wires 22 may have a complex structure such as metal core 222 with an outer insulated layer 223 (FIG. 2(*c*), e.g. enamel wire), metal-clad insulated core 224 (FIG. 2(*d*)), and metal 1-clad metal 2 wire 225 (FIG. 2(*e*)).

FIGS. 3(*a*)-(*c*) show the details of the OIS mechanism 12 of FIGS. 1(*a*)-1(*e*). In FIG. 3(*a*), the AF mechanism 18 is represented by an AF moving platform 20 and a rectangle block 21 without detail structure at the bottom. The OIS mechanism 12 may include the lens holder 14, a plurality of coils 30, and a plurality of magnets 40, wherein the plurality of coils 30 operatively associates with the plurality of magnets 40 to drive the lens holder 14 to move along a direction substantially perpendicular to the optical axis X. As shown in FIG. 3(*a*), the plurality of wires 22 may connect the lens holder 14 of the OIS mechanism 12 to the AF moving platform 20. In the present embodiment, the plurality of magnets 40 can be mechanically and firmly mounted on the AF moving platform 20, while the plurality of coils 30 can be attached firmly to the lens holder 14 of the OIS mechanism 12. Therefore, the plurality of coils 30 can move with the lens holder 14 together. In another embodiment, the coils 30 may be mounted on the AF moving platform 20, while the magnets 40 may be attached firmly to the lens holder 14 of the OIS mechanism 12. Therefore, the plurality of magnets 40 can move with the lens holder 14 together.

In the present embodiment, the OIS mechanism 12 may have four coil-magnet assemblies. Two coil-magnet assemblies may align with a first axis or first direction A1 while the other two coil-magnet assemblies may align with a second axis or second direction A2. The first axis A1 and second axis A2 are all laying in a plane substantially perpendicular to the optical axis X. The first axis A1 is orthogonal to the second axis A2. As shown in FIG. 3(*c*), the coils 30 can be facing one pole of the magnets 40. When electric current is applied to the coils 30, it will generate a magnetic field which interacts with the magnets 40 and generates either push or pull force, namely the generated electromagnetic force either pushing away the coils 30 or pulling the coils 30 closer. Since the coils 30 are firmly attached to the lens holder 14, the push or pull forces will be transferred to the lens holder 14 via the coils 30, and the lens holder 14 will be moving back and forth. Carefully control the ratio of the force along the first axis A1 to the force along the second axis A2, one can easily control the lens holder movement along any direction in the plane perpendicular to the optical axis X. Although the N pole of one magnet 40 is facing inside as shown in FIG. 3(*c*), it does not mean that all the N poles of the magnets 40 must be facing inside. In fact, every individual magnet 40 can have its own freedom to select the N pole facing inside or outside. It is because that one can always control the current direction of the coil 30 to get the same direction of force. In the present embodiment, both the first axis A1 and second axis A2 have two coil-magnet assemblies. In fact, only one coil-magnet assembly is enough for one axis. Two coil-magnet assemblies are just simply doubling the resulting force along the same axis. Needless to say, using one or two coil-magnet assemblies does not depart from the scope of protection defined herein.

In some other embodiments (FIG. 3(*b*)), the OIS mechanism 12 may include the lens holder 14, the plurality of coils 30, the plurality of magnets 40, the plurality of wires 22, and a yoke 26. The yoke 26 may be made of magnetic conductive material and normally used to spatially redistribute the magnetic field. In the present embodiment, the opening of yoke 26 may face upward. However, the opening can also be facing downward. Furthermore, the yoke 26 may be directly mounted on the AF moving platform 20. In some other embodiments, the yoke 26 of the OIS mechanism 12 may be integrally formed with the AF moving platform 20 of the AF mechanism 18.

FIGS. 4(a)-4(e) show many other coil-magnet assembly combinations of OIS mechanism 12. In some other embodiments, all the coils 30 may be operatively associated with one same magnet 401, 402 as shown in FIGS. 4(a) and 4(b). The magnet 401, 402 can have only one magnetization direction (shown by arrows) or various magnetization directions subject to the location of the magnet 401, 402. In another embodiment shown in FIG. 4(c), some coils 30 may be operatively associated with the same one magnet 403 and the rest of the coils 30 may be operatively associated with the other magnets 404, 405. In another embodiment shown in FIG. 4(d), coils 306 may be allocated on the top or bottom of the magnets 406. FIG. 4(e) is a cross sectional view of the coil-magnet structure of FIG. 4(d). In such embodiment, the magnetization direction is also laying in a plane perpendicular to the optical axis X defined by the lens. Coils 306 may be allocated on the top of the magnet 406. When electric current is applied to the coils 306, it generates a magnetic field whose South Pole or North Pole is facing the magnets 406. Due to the attractive or repulsive force between the poles of coils 306 and magnets 406, the lens holder 14 will be moved along the horizontal direction, as shown by the dotted arrows, which is perpendicular to the optical axis X.

FIG. 5 shows an embodiment of the AF mechanism 18, which may include an AF moving platform 20, at least one coil 305, at least one magnet 407, and a base 42. The base 42 can be used to hold the at least one magnet 407 and also provide a mechanical support to the AF mechanism 18. In some other embodiments, the base 42 may be separated into two components, one can be used to hold the at least one magnet 407 and the other one can be used as base. Needless to say, separating the base 42 into two components does not depart from the scope of protection defined herein. In the present embodiment, the at least one coil 305 of the AF mechanism 18 can be mechanically and firmly attached to and moving together with the AF moving platform 20. In other embodiments, the at least one coil 305 of the AF mechanism 18 may be mounted on the base 42, while the at least one magnet 407 may be mounted on and moving together with the AF moving platform 20. In FIG. 5, the AF moving platform 20 is the yoke 26 of the OIS mechanism 12 shown in FIG. 3(b). Actually, the AF moving platform 20 can be used as abase of the OIS mechanism 12. The lens holder 14 may be connected to this base 42 via a plurality of wires 22. FIG. 5 should be understood in such a way that the AF moving platform 20 can take any shape or structure as long as it can serve the purpose of the AF moving platform 20. It should be also understood that the AF moving platform 20 may be used as other functional components, such as a yoke of the OIS mechanism 12. In other words, the AF mechanism 18 and OIS mechanism 12 can share some common parts to reduce the material cost. In the present scenario, the AF moving platform 20 can also be used as abase of the OIS mechanism 12. In some embodiments, this base of the OIS mechanism 12 can be a yoke. Therefore, the AF moving platform 20 can be used as a yoke of the OIS mechanism 12.

Figure 6A:
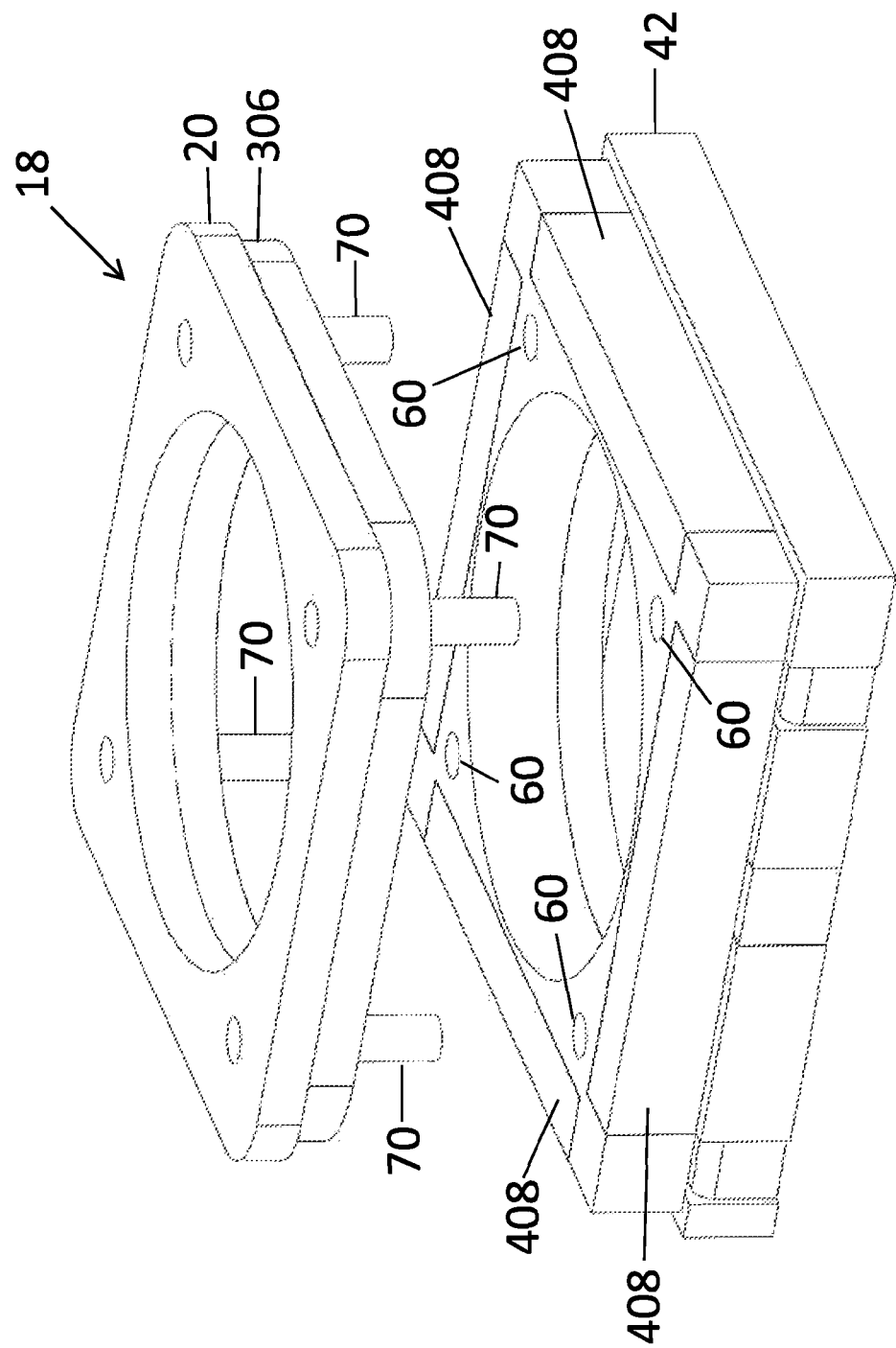
Figure 6C:
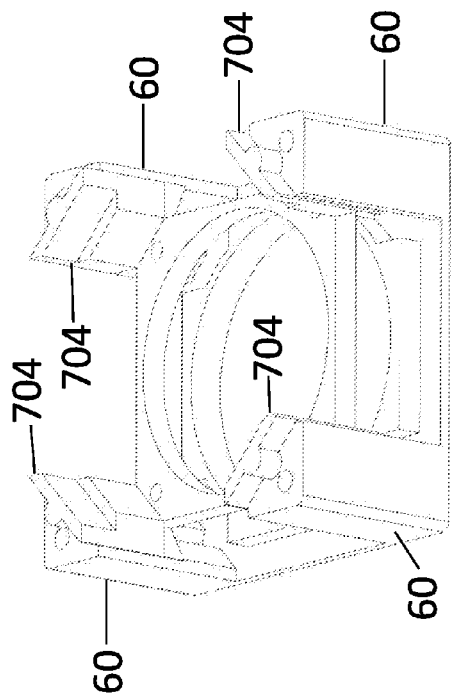
Figure 6E:
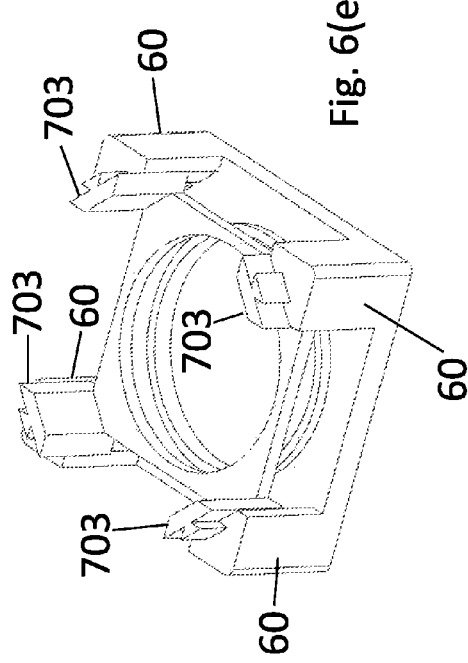
Figure 6B:
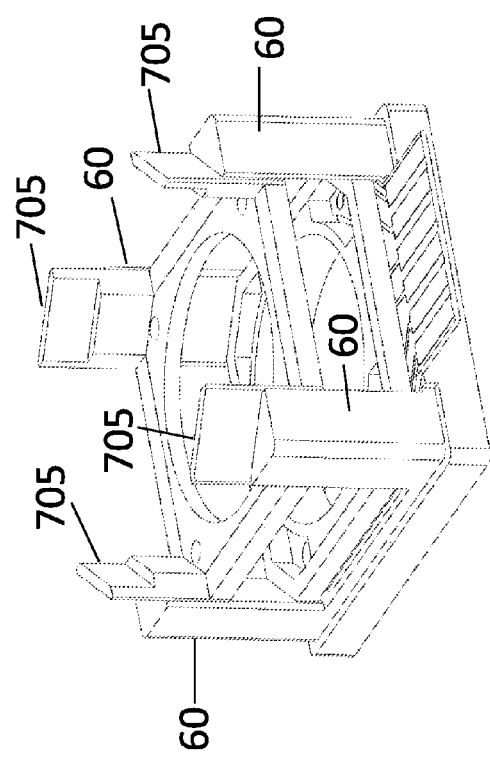
Figure 6D:
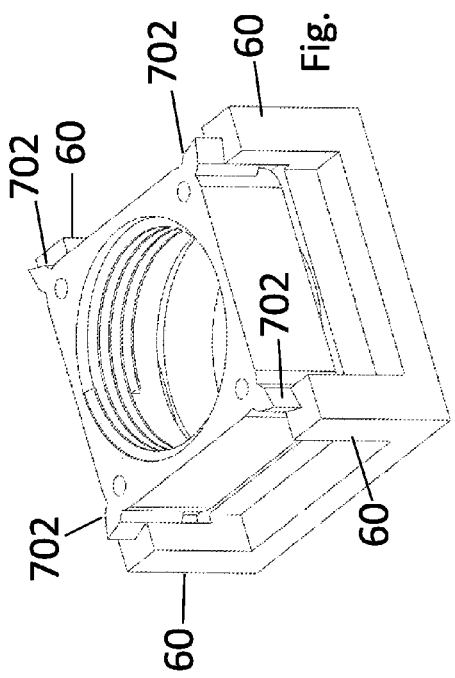

FIGS. 6 and 6(a)-6(e) show other embodiments of the AF mechanism 18. As shown in FIG. 6(a), the AF mechanism 18 may include the AF moving platform 20, the coil 306, the magnets 408, the base 42, and at least a guiding mechanism, which may include a stationary guide member 60 and a slidable guide member 70. The guiding mechanism can be used to guide the movement of the AF moving platform 20 to move along the optical axis X. In such an embodiment, the coil 306 may be mechanically and firmly attached to the AF moving platform 20, while the magnets 408 may be firmly mounted on the base 42. In another embodiment, the magnets 408 can be firmly attached to the AF moving platform 20, while the coil 30 can be mounted on the base 42. The coil 308 may be operatively associated with the magnets 408 to move the AF moving platform 20 upward or downward. A plurality of slidable guide members 70, such as guiding shafts, can be mounted on the AF moving platform 20. A plurality of stationary guide members 60, such as guiding holes, may be provided on the base 42. During autofocus movement, the guiding shafts 70 can slide inside the guiding holes 60. Needless to say, exchanging the mounting locations of the guiding shafts and the guiding holes does not depart from the scope of protection defined herein. For example, as depicted in FIG. 6, a plurality of guiding shafts 701 can be mounted on the base 42, and a plurality of guiding holes 601 can be provided on the AF moving platform 20. In some other embodiments, various means and shapes may be used as guiding mechanism. Such means and shapes may include but not limited to guiding shafts 701, V-shaped grooves 702, dovetail-shaped grooves 703, C-shaped grooves 704, planes 705, holes 601, rings, etc. as shown in FIGS. 6(b)-6(e). Although four shafts 70 are shown in FIG. 6(a), it may not be necessary to use four guiding shafts in the present embodiment. Four shafts are just purely for the symmetric arrangement of the shafts 70 on the rectangular base 42. Needless to say, using 1, 2, or 3 shafts/guiding mechanisms or even more shafts/guiding mechanisms in the implementation does not depart from the scope of the protection defined herein.

Figure 7A:
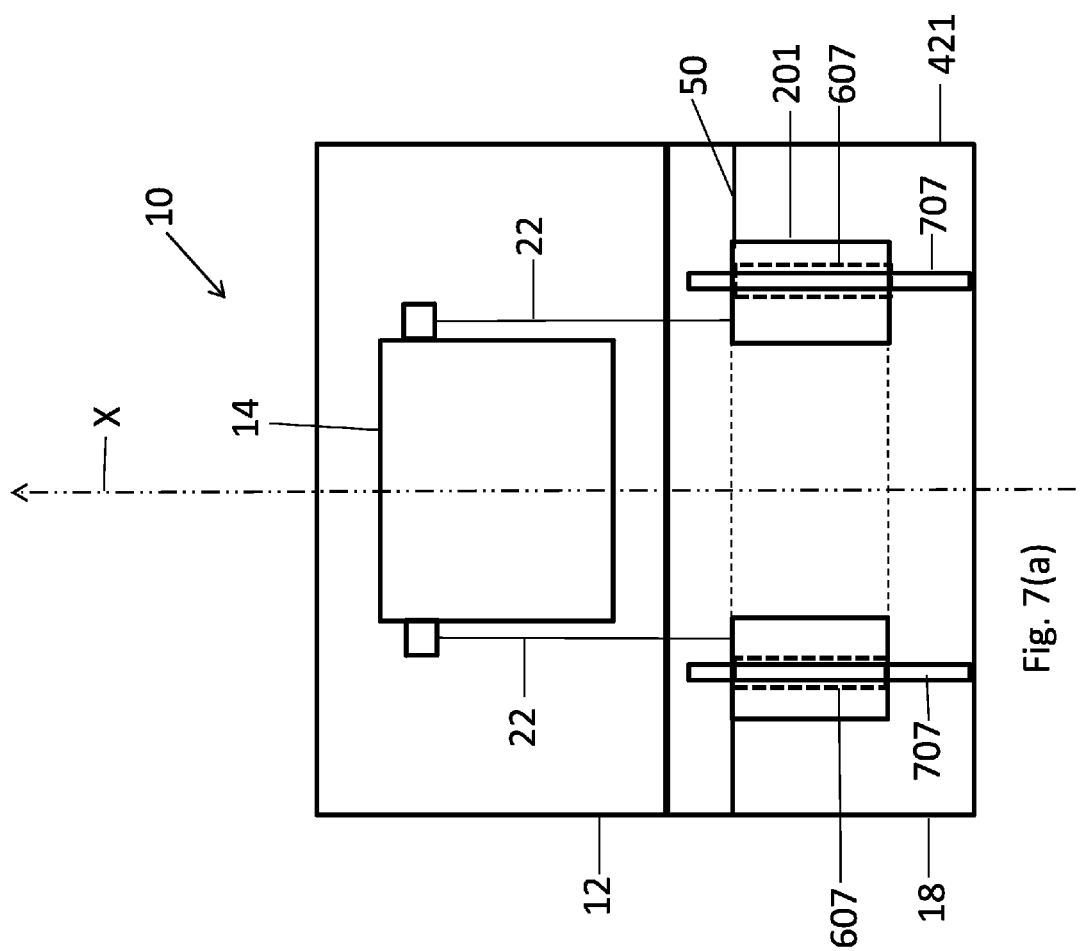

FIGS. 7(a)-7(c) show another embodiment of the AF mechanism 18, which may include the AF moving platform 20, at least one coil 307, at least one magnet 409, a base 421, at least one guiding mechanism 607, 707, and at least one leaf spring 50. The guiding mechanism 607, 707 can be used to guide the movement of the AF moving platform 20 along the optical axis X. The leaf spring 50 can be used to provide restoring force to pull back the AF moving platform 20 when the coil is de-energized. In one embodiment shown in FIG. 7(b), the leaf spring 50 can be coupled to an upper portion of the AF moving platform 20. The leaf spring 50 may include three zones, namely an outer zone 501, an inner zone 502, and a buffer zone 503 extending between the outer and inner zones 501, 502. The inner zone 502 can be connected to the AF moving platform 20. The outer zone 501 can be connected a stationary potion of the AF mechanism 18. The buffer zone 503 can be the elastic deformation area of the leaf spring 50 during autofocus movement. It should be noted that although the leaf spring 50 can be connected to the upper portion of the AF moving platform 20 as depicted in FIG. 7(b), the leaf spring 50 may be connected to other portion of the AF moving platform 20 in other embodiments. Moreover, the coil 307 may be mechanically and firmly attached to the AF moving platform 20, while the magnets 409 can be firmly mounted on the base 421. In another embodiment, the magnets 409 may be firmly attached to the AF moving platform 20, while the coil 307 can be mounted on the base 421. The coil 307 can be operatively associated with the magnets 409 to move the AF moving platform 20 upward or downward. A plurality of slidable guide members, such as guiding shafts 707, can be mounted on the AF moving platform 20. A plurality of stationary guide members, such as guiding holes 607, can be provided on the base 421. During autofocus movement, the guiding shafts 707 can slide inside the guiding holes 607. Needless to say, exchanging the mounting locations of the guiding shafts and the guiding holes does not depart from the scope of protection defined herein. In some other embodiments, various means and shapes may be used as guiding mechanism. Such means and shapes may include but not limited to guiding shafts, V-shaped grooves, dovetail-shaped grooves, C-shaped grooves, planes, holes, rings, etc. as illustrated in FIGS. 6(b)-6(e) of the previous embodiment. Although four guiding shafts are used in the previous embodiment, it may not be necessary to use four guiding shafts in the present embodiment. Four shafts are just purely for the symmetric arrangement of the shafts on the rectangular base 421. Needless to say, using 1, 2, or 3 shafts/guiding mechanisms or even more shafts/guiding mechanisms in the implementation does not depart from the scope of the protection defined herein.

FIG. 8(a) illustrates another embodiment of the AF mechanism 18, which may include an AF moving platform 202, a base 422, and a plurality of leaf springs 51, 52. In this embodiment, the guiding mechanism is replaced by the plurality of leaf springs 51, 52. At least two leaf springs 51, 52 may be connected to the AF moving platform 202. One leaf spring 51 may be connected to an upper portion of the AF moving platform 202, and the other leaf spring 52 may be connected to a lower portion of the AF moving platform 202. Each leaf spring 51, 52 may have three areas or zones, namely an outer zone 511, 521, an inner zone 512, 522, and a buffer zone 513, 523, as illustrated in FIGS. 8(c)-8(e). The outer zones 511, 521 of the leaf springs 51, 52 can be firmly attached to a stationary portion of the AF mechanism 18, such as but not limited to base 422 of AF mechanism 18. The inner zones 512, 522 of the leaf springs 51, 52 can be connected to the upper portion and the lower portion of the AF moving platform 202 respectively. The spring buffer portions 513, 523 are the deformation zones when AF mechanism 18 is working and moving the AF moving platform 202.

In FIG. 8(b) is another embodiment of the AF mechanism 18 of FIG. 8(a). This embodiment has a higher stability over the embodiment in FIG. 8(a) due to a taller AF moving platform 203 and a longer distance between the leaf springs 51, 52.

FIGS. 8(c)-8(e) show another embodiment of the AF mechanism 18. In the present embodiment, the AF mechanism 18 may include an AF moving platform 204, at least one coil 308, at least one magnet 410, a yoke 262, and a base 424. The coil 308 can be firmly attached to the AF moving platform 204. The magnet 410 can be mounted on the yoke 262, and the coil 308 can be inserted into the space between the magnet 410 and yoke 262. The yoke 262 may be mounted on the base 424. Two leaf springs 51, 52 may be connecting the AF moving platform 204 to the base 424. One leaf spring 51 may be connected to an upper portion of the AF moving platform 204, while the other one 52 may be connected to a lower portion of the AF moving platform 204. Either the upper or lower portion of the AF moving platform 204 can be used to connect to the OIS mechanism 12. The lens holder 14 of the OIS mechanism 12 can be connected to the upper portion or bottom portion of the AF moving platform 204 via a plurality of wires 22. The upper leaf spring 51 and lower leaf spring 52 do not need to be the same. They can have different shapes, different spring constants, and different parameters.

As shown in FIGS. 9(a)-9(e), leaf springs may take many forms, shapes or structures. Some leaf springs 91, 92, 95 may have a complete unitary body. Some leaf springs 93, 94 may be made of a plurality of smaller leaf springs 931, 941, wherein the smaller leaf springs 931, 941 may be arranged in a same plane to form a big leaf spring 93, 94. These leaf springs may be normally separated because they will be used for electric connection of coils.

FIGS. 10(a)-10(d) show the lens driving apparatus described above. There may be three types of lens driving apparatuses. FIG. 10(a) shows a guiding type; FIG. 10(b) shows a guiding+leaf spring type; and FIGS. 10(c) and (d) show a leaf springs type. The small circles in the figures represent locations where a Hall sensor or a position encoder 99 can be mounted. Hall sensor or a position encoder 99 can be used to measure the lens position during AF movement and/or OIS movement.

What is claimed is:
1. A miniature lens driving apparatus comprising:
 a) an optical image stabilization mechanism comprising a lens holder for holding therein a lens assembly which defines an optical axis;
 b) an autofocus mechanism comprising an autofocus moving platform movable along the optical axis; and
 c) a plurality of wires;
 d) wherein the optical image stabilization mechanism comprises an electromagnetic actuator comprising an optical image stabilization coil, characterizing in that the optical image stabilization coil is attached to the lens holder and enables to move the lens holder along the direction substantially perpendicular to the optical axis;
 e) wherein the autofocus mechanism comprises an electromagnetic actuator comprising an autofocus coil, characterizing in that the autofocus coil is attached to the autofocus moving platform and enables to move the autofocus moving platform along the optical axis; and
 f) wherein the plurality of wires couples the lens holder with the autofocus moving platform, and the entire autofocus moving platform is movable together with the plurality of wires and the lens holder along the optical axis.
2. The lens driving apparatus as claimed in claim 1, wherein the plurality of wires is selected from the group consisting of metal wires, enamel wires, metal-clad metal wires, metal-clad non-conductive material wires, non-conductive material wires, and combinations thereof; and wherein the non-conductive material is selected from the group consisting of polymers, plastics, rubber, organic and inorganic materials.
3. A miniature lens driving apparatus comprising:
 a) an optical image stabilization mechanism comprising a lens holder for holding therein a lens which defines an optical axis;
 b) an autofocus mechanism comprising an autofocus moving platform; and
 c) a plurality of wires adapted to couple the lens holder with the autofocus moving platform;
 d) wherein the optical image stabilization mechanism comprises an electromagnetic actuator comprising an optical image stabilization coil, characterizing in that the optical image stabilization coil is attached to the lens holder, e) wherein the autofocus mechanism comprises an electromagnetic actuator comprising an autofocus coil, characterizing in that the autofocus coil is attached to the autofocus moving platform, f) wherein the optical image stabilization mechanism is capable of moving the lens holder along a direction substantially perpendicular to the optical axis, and the autofocus mechanism is capable of moving the autofocus moving platform along the optical axis; and g) wherein the entire autofocus moving platform is movable together with the plurality of wires and the lens holder along the optical axis.

4. The lens driving apparatus as claimed in claim 3, wherein the optical image stabilization mechanism comprises a piezoelectric actuator capable of moving the lens holder along the direction substantially perpendicular to the optical axis.

5. The lens driving apparatus as claimed in claim 3, wherein the optical image stabilization mechanism comprises a micro-electro-mechanical actuator capable of moving the lens holder along the direction substantially perpendicular to the optical axis.

6. The lens driving apparatus as claimed in claim 3, further comprising at least one yoke made of magnetic conductive materials and operatively associated with a coil-magnet assembly to confine spatially magnetic field distribution.

7. The lens driving apparatus as claimed in claim 3, wherein the plurality of wires is selected from the group consisting of metal wires, enamel wires, metal-clad metal wires, metal-clad non-conductive material wires, non-conductive material wires, and combinations thereof; and wherein the non-conductive material is selected from the group consisting of polymers, plastics, rubber, organic and inorganic materials.

8. The lens driving apparatus as claimed in claim 3, wherein the plurality of wires may be made of conductive material to provide direct or indirect electric connection between a plurality of coils mounted on the optical image stabilization mechanism and a plurality of electrodes respectively.

9. The lens driving apparatus as claimed in claim 3, wherein the autofocus mechanism comprises at least one guiding mechanism which comprises a stationary guide member and a slidable guide member; and wherein the stationary guide member is firmly mounted on a base of the autofocus mechanism, while the slidable guide member is firmly mounted on the autofocus moving platform of the autofocus mechanism.

10. The lens driving apparatus as claimed in claim 9, wherein the guiding mechanism comprises guiding members selected from the group consisting of guiding shafts, V-shaped grooves, dovetail-shaped grooves, C-shaped grooves, guiding planes, guiding holes and guiding rings.

11. The lens driving apparatus as claimed in claim 9, wherein the autofocus mechanism further comprises at least one spring connecting the autofocus moving platform and a stationary portion of the autofocus mechanism.

12. The lens driving apparatus as claimed in claim 11, wherein the at least one spring is selected from the group consisting of leaf spring, helix spring, and elastic film.

13. The lens driving apparatus as claimed in claim 11, wherein the spring comprises an outer zone, an inner zone, and a buffer zone; wherein the outer zone is connected to a stationary portion of the autofocus mechanism, the inner zone is connected to the autofocus moving platform, and the buffer zone, which is the zone between the outer and inner zones, is deformable during movement of the autofocus moving platform.

14. The lens driving apparatus as claimed in claim 9, wherein the optical image stabilization mechanism further comprises one Hall sensor to measure lens position during optical image stabilization movement.

15. The lens driving apparatus as claimed in claim 9, wherein the autofocus mechanism further comprises at least one Hall sensor to measure lens position during autofocus movement.

16. The lens driving apparatus as claimed in claim 3, wherein the autofocus mechanism further comprises a plurality of springs, wherein one of the springs is connecting an upper portion of the autofocus moving platform to a stationary portion of the autofocus mechanism, and another one of the springs is connecting a lower portion of the autofocus moving platform to the stationary portion of the autofocus mechanism.

17. The lens driving apparatus as claimed in claim 3, wherein the optical image stabilization mechanism further comprises at least one position encoder to measure lens position during optical image stabilization movement.

18. The lens driving apparatus as claimed in claim 3, wherein the autofocus mechanism further comprises at least one position encoder to measure lens position during autofocus movement.

* * * * *